United States Patent [19]

Payne et al.

[11] Patent Number: 5,532,039

[45] Date of Patent: Jul. 2, 1996

[54] THERMAL BARRIERS FOR BUILDINGS, APPLIANCES AND TEXTILES

[75] Inventors: Ed Payne, Longmont; Bernard T. Perry, Boulder; Terry D. Walker, Englewood, all of Colo.

[73] Assignee: Gateway Technologies, Inc., Boulder, Colo.

[21] Appl. No.: 232,737

[22] Filed: Apr. 25, 1994

[51] Int. Cl.$^6$ ............................................. B32B 9/00
[52] U.S. Cl. ............................ 428/116; 428/68; 428/72; 428/76; 428/117; 428/192; 428/194; 428/320.2; 428/321.5; 428/323; 428/372; 428/402.24; 428/407; 428/913; 126/618; 126/619
[58] Field of Search ...................... 428/321.5, 320.2, 428/332, 372, 913, 68, 76, 192, 194, 220, 323, 72, 117, 116, 402.24, 407; 126/430

[56] References Cited

U.S. PATENT DOCUMENTS

| | | | |
|---|---|---|---|
| 3,852,401 | 12/1974 | Suzuki et al. | 264/182 |
| 4,003,426 | 1/1977 | Best et al. | 165/53 |
| 4,446,917 | 5/1984 | Hayes | 165/185 |
| 4,504,402 | 3/1985 | Chen et al. | 252/70 |
| 4,531,511 | 7/1985 | Hochberg | 126/450 |
| 4,572,864 | 2/1986 | Benson et al. | 424/305 |
| 4,581,285 | 4/1986 | Mahefkey, Jr. | 428/285 |
| 4,587,279 | 5/1986 | Salyer et al. | 523/206 |
| 4,612,239 | 9/1986 | Dimanshteyn et al. | 428/246 |
| 4,617,332 | 10/1986 | Salyer et al. | 524/4 |
| 4,645,613 | 2/1987 | Harvey et al. | 252/70 |
| 4,711,813 | 12/1987 | Salyer | 428/402 |
| 4,747,240 | 5/1988 | Voisinet et al. | 52/178 |
| 4,756,958 | 7/1988 | Bryant et al. | 428/302.2 |
| 4,774,133 | 9/1988 | Doree | 428/321 |
| 4,797,160 | 1/1989 | Salyer | 106/96 |
| 4,825,939 | 5/1989 | Salyer et al. | 165/53 |
| 4,856,294 | 8/1989 | Scaringe et al. | 61/239 |
| 5,053,446 | 10/1991 | Salyer | 524/8 |
| 5,069,358 | 12/1991 | Avery, Jr. | 220/426 |
| 5,106,520 | 4/1992 | Salyer | 252/70 |
| 5,211,949 | 5/1993 | Salyer | 424/402 |
| 5,254,380 | 10/1993 | Salyer | 428/35.7 |
| 5,282,994 | 2/1994 | Salyer | 252/70 |
| 5,290,904 | 3/1994 | Colvin et al. | 428/68 |
| 5,415,222 | 5/1995 | Colvin et al. | 165/46 |

FOREIGN PATENT DOCUMENTS

WO93/24241  12/1993  WIPO.

OTHER PUBLICATIONS

"Innovative Protective Clothing: PCM Microcapsules as Barrier for Optimized Cold Protection", *Techtextil–Telegramm*, 28 Mar. 1994, pp. 2–3, Frankfurt, Germany.
"Fabrics given enhanced thermal properties", *Chemical & Engineering News*, p. 15, Oct. 20, 1965, Washington, DC.
George, K. and Shepard, M., "Phase Change Wallboard For Peak Demand Reduction", *Tech Memo*, ©Aug. 1993, E Source, Inc., Boulder, Colorado.
"How to Wrap a Home in Energy Savings", Oct. 1993, Tyvek® Housewrap, DuPont, Wilmington, Delaware.
Search results obtained from a search of public computer patent databases (pp. 2–99) conducted Jul. 16, 1993.
Search results obtained from a search of public computer patent databases (pp. 5–51) conducted Jul. 19, 1993.
Search results obtained from a search of public computer patent databases (pp. 2–17) conducted Nov. 1, 1993.

*Primary Examiner*—Patrick J. Ryan
*Assistant Examiner*—Abraham Bahta
*Attorney, Agent, or Firm*—Carol W. Burton; Holland & Hart

[57] ABSTRACT

A thermal barrier for controlling heat transfer across through buildings, appliances and textile products is disclosed. The thermal barrier includes opposing, spaced apart sheets which define at least one chamber therebetween. A temperature stabilizing material is disposed in the chamber. The temperature stabilizing material is preferably a phase change material such as a paraffinic hydrocarbon, hydrated salt, plastic crystal or glycol. In one embodiment, an interconnecting structure is disposed between opposing sheets to create a plurality of cells of the chamber into which the temperature stabilizing material is uniformly disposed. A method of manufacturing the thermal barrier is also disclosed.

29 Claims, 3 Drawing Sheets

THERMAL BARRIERS FOR BUILDINGS, APPLIANCES AND TEXTILES

BACKGROUND OF THE INVENTION

1. Field of the Invention

The present invention relates to thermal barriers useful in building construction, appliance manufacturing, textiles and other insulation applications, and methods of making and using same. The present invention is particularly directed to thermal barriers containing energy absorbing, temperature stabilizing material for use in buildings, in housewares, and in textile products.

2. Background of the Invention

Insulation is typically used in walls and ceilings of buildings, walls of home appliances and other applications to prevent heat from being conducted either into or out from an enclosed environment so that a desired temperature can be maintained inside. Insulative materials for buildings, appliances and other applications often utilize dead air space present within the materials to insulate from hot or cold environments. The efficiency of such insulating materials generally depends on the amount of dead air space present within the insulative materials, there generally being a direct correlation between the volume of dead air space in conventional insulative material and a particular material's insulating capacity. Because of this correlation, many of the commonly used insulative materials are bulky and difficult to install. Moreover, many such insulative materials lose their insulative capabilities and contribute undesirably to the transfer of heat into or out of an enclosure when the dead air space of the insulative material is compressed or thermally penetrated by convection, conduction or radiation. Conventional insulating materials typically lose their ability to insulate when they become wet, due to the fact that moisture in the insulating materials increases the thermal conductivity of the materials.

Because these problems of bulkiness and insulation failure are typically experienced with traditional insulative materials, there has been a long-felt need for thinner, flexible, thermally effective insulative materials which can block the flow of heat from or to an enclosed environment under a variety of temperature conditions. Prior attempts to develop insulation having the aforementioned qualities have utilized compressed carbon, perlite, fiberglas™ and various foams None of these attempts have resulted in a thin, flexible, thermally effective insulative material which can compete with or surpass the effectiveness of traditional insulation.

U.S. Pat. No. 5,290,904 to Colvin et al. issued Mar. 1, 1994, describes a thermal shield incorporating thermal energy absorbing material positioned between two substantially flat flame resistant covering layers. The thermal energy absorbing material may be a phase change material positioned between the covering layers "in bulk" or placed between the covering layers in a micro- or macro-encapsulated form.

However, under certain conditions the thermal energy absorbing material of thermal shield laminates may become displaced. Displacement of the thermal energy absorbing material can result in discontinuities in the thermal shield, with undesired heat transfer subsequently occurring across the thermal shield.

U.S. Pat. Nos. 5,254,380, 5,211,949, 5,282,994 and 5,106,520 for "Dry Powder Mixes Comprising Phase Change Materials" to Salyer describe free flowing, conformable powder-like mixes of silica particles and a phase change material which the silica particles of between $7 \times 10^{-3}$ to $7 \times 10^{-2}$ microns are mixed with phase change material in a ratio of up to 80% by weight of phase change material. However, under certain conditions the powders described in the Salyer patents may also become displaced. Under these and other circumstances, heat may preferentially flow through gaps of an item in which the powder has become displaced or is otherwise unevenly distributed, resulting in undesirable heat transfer.

It is against this background that the significant improvements and advancement of the present invention have taken place in the field of thermal barriers.

SUMMARY OF THE INVENTION

In accordance with its major aspects, thermal barriers of the present invention comprise opposing surfaces defining a chamber. A connecting structure is attached to each of the opposing surfaces and is positioned within the chamber, subdividing the chamber into a plurality of cells. A temperature stabilizing material is disposed in each cell. Preferably, a uniform distribution of the temperature stabilizing material is disposed in the cells and throughout the thermal barrier.

A preferred temperature stabilizing material used in the barriers of the present invention comprises a phase change material, such as a paraffinic hydrocarbon, hydrated salt, plastic crystal or glycol, experiencing desired phase changes at particular temperatures. The temperature stabilizing material may be microencapsulated to prevent leakage and to facilitate the usage of different phase change materials within a single barrier. Several different compatible phase change materials may be utilized within the barrier to broaden the temperature ranges at which the thermal barrier is effective.

In a preferred embodiment of the present invention, the plurality of closely adjacent, noncommunicating cells are formed in a "bubble pack" configuration. This configuration includes a first sheet in which are formed closely adjacent depressions, a temperature stabilizing material disposed in the depressions, and a second sheet overlying the first sheet which defines the cells and encases the temperature stabilizing material in the cells. To enhance uniformity of the temperature stabilizing material across the "bubble pack" thermal barrier, a pair of the "bubble pack" thermal barriers are overlaid in an offset alignment.

A method of making the thermal barrier is disclosed in which depressions are thermally formed in a first sheet. A temperature stabilizing material is distributed in the depressions in a substantially uniform manner. A second sheet is heat and pressure sealed to the first sheet, encasing the temperature stabilizing material in the cells formed thereby.

The present invention provides for thermal barriers that are durable, flexible, resistant to degradation by moisture, resistant to leakage when punctured, and deformable without damage or significant loss of thermal barrier capabilities. The thermal barrier contains a temperature stabilizing material that displays enhanced, reversible thermal properties over a specified temperature rang, and is not subject to undesired displacement.

Barriers manufactured in accordance with the present invention can be used in various ways as insulative material for construction purposes, in the manufacture of appliances such as ovens and refrigerators, and for textile products such as clothing, carpets and draperies for use in various temperature environments.

A more complete appreciation of the present invention and its scope can be obtained form understanding the accompanying drawings, which are briefly summarized below, the following detailed description of the presently preferred embodiments of the invention, and the appended claims.

DETAILED DESCRIPTION

The thermal barriers of the present invention have the capability to absorb or release thermal energy to reduce or eliminate heat transfer at the temperature stabilizing range of the particular temperature stabilizing materials used in the barrier. The temperature stabilizing materials' ability to store or release latent heat acts to minimize the temperature differential between the thermal barrier and the side of the thermal barrier which is to be kept at a constant temperature or within a desired temperature range. Preferred temperature stabilizing materials are able to inhibit or stop the flow of thermal energy through the barrier during the time the temperature stabilizing material is absorbing or releasing heat, typically during the material's change of phase. This action is transient, i.e., it will be effective as a barrier to thermal energy until the total latent heat of the temperature stabilizing material is absorbed or released during the heating or cooling process. In contrast to insulation which relies on trapped air for thermal barrier capabilities, the heat storage and release properties of the barriers of the present invention do not suffer degradation in thermal performance when the barrier is compressed or is subjected to moisture.

Thermal energy may be stored or removed from the temperature stabilizing material contained in the barrier and the barrier can be recharged by a source of heat or cold. By selecting appropriate temperature stabilizing materials, the thermal barrier can be used in many different applications where the stabilization of temperatures is desired. Two or more different temperature stabilizing materials can be used to address particular temperature ranges and such materials can be mixed together, microencapsulated or segregated into different zones, layers or chambers within a thermal barrier.

The thermal barriers of the present invention comprise temperature stabilizing material placed, enclosed, or encased between opposing sheets. Disposed between opposing surfaces is an interconnecting structure which defines a plurality of cells between the opposing surfaces and maintains a predetermined distribution of the temperature stabilizing material thereamong. The peripheral edges of opposing sheets may be sealed to prevent the temperature stabilizing material from leaking from the barrier. One or more of the sheets may have a reflective material applied to either or both sides to reduce radiant heat loss or absorption. The sheets are preferably resistant to leakage or rupture and are capable of being subjected to repeated external mechanical stresses with minimum changes in the thermal characteristics of the barrier.

Figure 1:
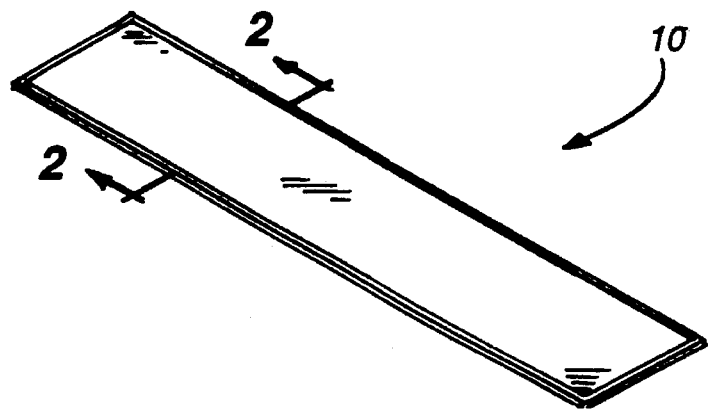
FIG. 1 is a perspective view a thermal barrier having temperature stabilizing material positioned between two sheets.
Figure 2:
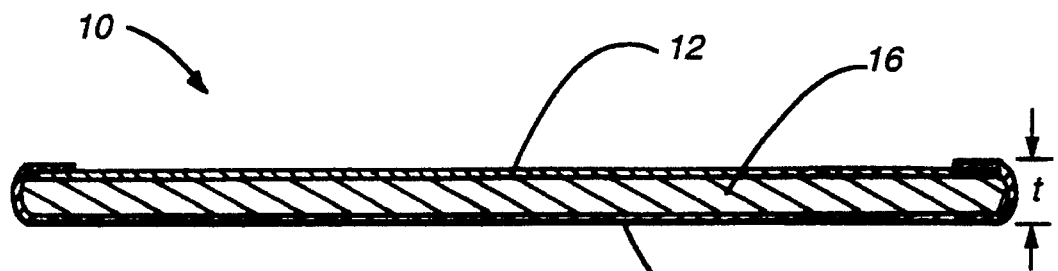
FIG. 2 is a sectional view of the thermal barrier of FIG. 1 taken along the line 2—2.

A thermal barrier 10 is shown in FIGS. 1 and 2. The thermal barrier 10 is a panel in which a temperature stabilizing material 16 is placed between two, preferably flexible sheets 12 and 14. As used herein "temperature stabilizing material" is material which absorbs or releases heat at a preselected and relatively constant temperature, including phase change materials such as paraffinic hydrocarbons; hydrated salts such as $CaCl_2 \cdot 6H_2O$; a mixture of hydrated salts with other compounds; glycols, glycerol, glycosides or mixtures of water with glycols, glycerol or glycosides; clathrates; or microencapsulated phase change materials utilizing the aforementioned materials or utilizing plastic crystals such as 2,2-dimethyl-1,3-propanediol (DMP) or 2-hydroxymethyl-2-methyl-1,3-propanediol (HMP).

Some suitable paraffinic hydrocarbon phase change materials are shown below in the following table which indicates the number of carbon atoms contained in such materials, which is directly related to the melting point of such materials.

| COMPOUND NAME | NUMBER OF CARBON ATOMS | MELTING POINT DEGREES CENTIGRADE |
| --- | --- | --- |
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

In addition to the paraffinic hydrocarbons and hydrated salts described above, plastic crystals such as DMP and HMP and the like may be used as temperature stabilizing materials. When plastic crystals absorb thermal energy, the molecular structure is temporarily modified without changing the phase of the material. Plastic crystals may be employed alone or in combination with other temperature stabilizing materials in any of the configurations described herein.

As shown in FIGS. 1 and 2, a barrier 10 is comprised of a first sheet 12 and a second sheet 14 positioned in a closely spaced apart orientation. Sheets 12 and 14 used in the present invention are selected for various desired characteristics such as impermeability to temperature, flexibility, durability, resistance to moisture, etc. Sheets can be constructed, for example, from fabric, plastic, foil, film, paper or foam.

When heated, the temperature stabilizing material 16 disposed within the thermal barrier 10 absorbs thermal energy while changing phase from a solid to a liquid and releases thermal energy when changing phase from a liquid to a solid. In this way, the temperature stabilizing material 16 acts as a barrier to heat flow, since a quantity of thermal energy must be absorbed by the temperature stabilizing material before the temperature of the material 16 can continue to rise. When such material is alternatively exposed to a cool temperature environment, the material changes from a liquid to a solid phase, and thus acts as a barrier to the conveyance of cold temperatures across the barrier.

By selection of the appropriate temperature stabilizing material 16 for the thermal barrier 10, and/or by coupling the thermal barrier with an appropriate energy source that adds or subtracts thermal energy from the barrier, it is possible to maintain a given temperature for an extended period of time because an isothermic area is created within the barrier. The thermal barrier 10 thus constructed exhibits enhanced thermal stability when subjected to heat or cold.

In addition to constructing a thermal barrier 10 using one temperature stabilizing material 16, two or more different stabilizing temperature materials may be selected and mixed together to tailor the thermal barrier for a specific temperature environment or for expected fluctuating conditions. Alternatively, distinct temperature stabilizing materials 16 can be used to construct individual thermal barriers 10 which can be layered with other thermal barriers 10 having temperature stabilizing materials 16 with distinct properties.

Figure 4:
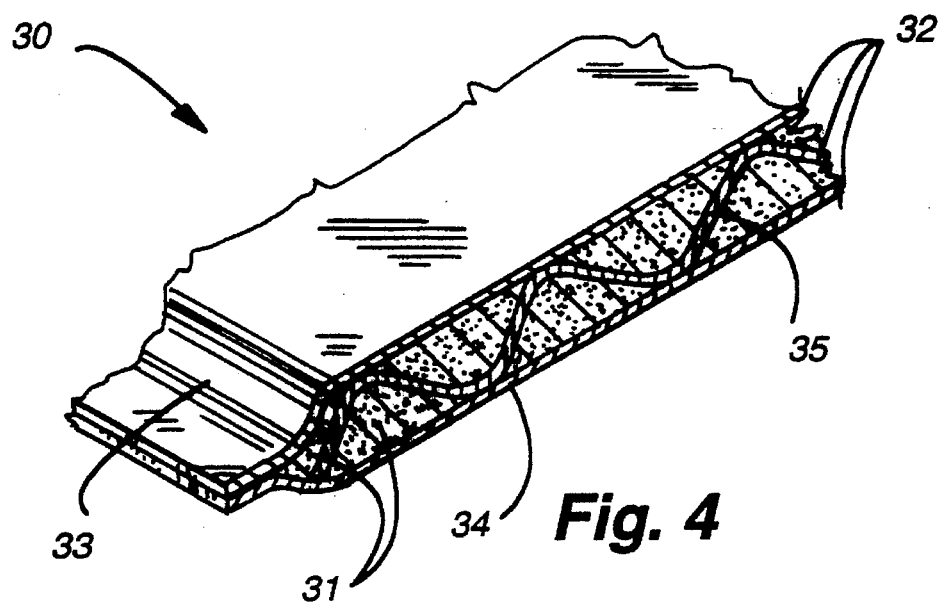
FIG. 4 is a sectional view of a thermal barrier of the present invention in which chambers of a corrugated structure are filled with temperature stabilizing material.

In FIG. 4, a thermal barrier 30 of the present invention is shown in which temperature stabilizing material 31 is placed between two adjacent sheets 33 and 34 into a plurality of cells 36. The cells 36 are defined by the sheets 33 and 34 and an interconnecting sheet 35, forming a "corrugated" structure 32. The two adjacent sheets 33 and 34 are maintained in spaced relationship to each other by the interconnecting sheet 35 and the temperature stabilizing material 31 therebetween. The thermal barrier shown in FIG. 4 is constructed by attaching the interconnecting sheet 35 with an adhesive at alternating offset locations on the opposing sheets 33 and 34 to create the cells 36 therebetween, positioning a substantially uniform amount of temperature stabilizing material into each of the cells 36, and joining adjacent edges of the sheets 33 and 34. The corrugated construction of the thermal barrier 30 maintains a substantially uniform thickness of temperature stabilizing material across the thermal barrier 30. This is important because it creates a substantially "monolithic" barrier of temperature stabilizing material across which heat is evenly and controllably conducted. The corrugated structure 32 prevents gaps in the thermal barrier in which there would otherwise be an absence of temperature stabilizing material and also prevents an uneven distribution of temperature stabilizing material within the thermal barrier, so that heat is not conducted preferentially and undesireably across portions of the thermal barrier.

Figure 5:
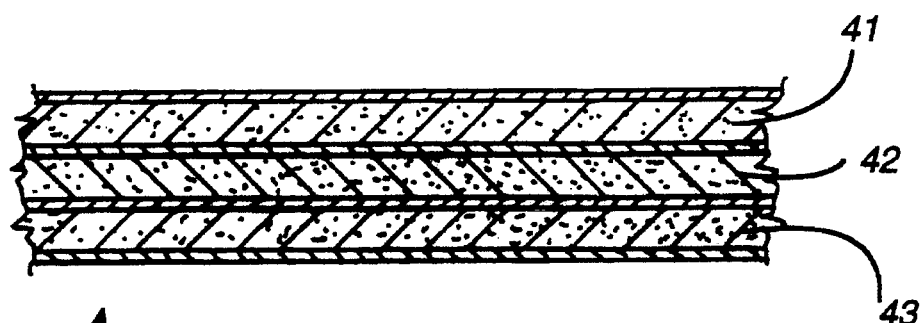
FIG. 5 is a perspective view of an alternative embodiment of the thermal barrier wherein layers of different temperature stabilizing materials are used.

As shown in FIG. 5, different layers 41, 42 and 43 of different phase change materials can be used to construct a thermal barrier 40 for use in different temperature environments. In such a manner, the thermal characteristics of a particular thermal barrier 40 can be appropriately modified to conform to particular needs and desires as dictated by changing or unusual conditions.

Figure 6:
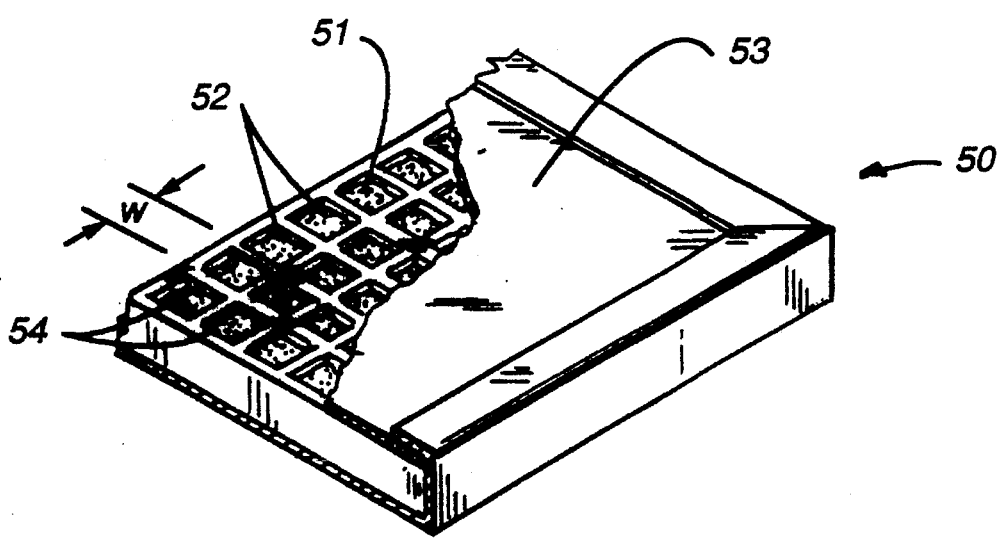
FIG. 6 is a perspective sectional view with cutaway portion of a thermal barrier in which temperature stabilizing material has been placed into discrete chambers.

As shown in FIG. 6, a thermal barrier 50 includes temperature stabilizing material 51 deposited into cells 52 defined by interconnecting walls 54. A sheet 53 covers the cells 52 to prevent leakage or shifting of the material 51 from the cells 52. Material 51 is deposited in the cells 52 so as to substantially but not completely fill each of the cells 52. Partial filling is preferable in order to compensate for expected expansion and contraction of the material 51 during phase changes. The interconnecting walls 54 of the barrier 50 may be of a rectangular, hexagonal, or other regular shape, and are referred to herein as "honey-comb" structures. The walls 54 are thin relative to the width "w" of cells 52, preferably having at most a thickness of 1% of the width "w" so that heat otherwise subject to conduction across the thermal barrier 50 is presented with a substantially "monolithic" layer of temperature stabilizing material, and is less likely to be conducted across thick intercellular walls.

Figure 7:
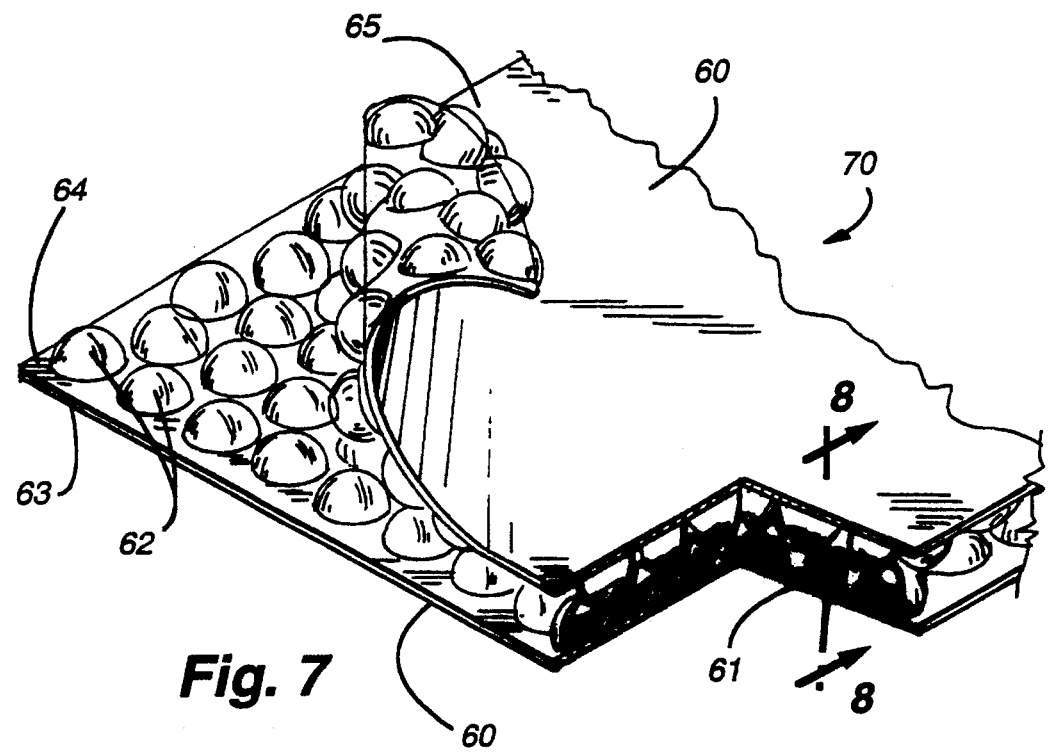
FIG. 7 is a perspective view of a thermal barrier embodiment of the present invention in which individual bubbles contain temperature stabilizing materials.
Figure 8:
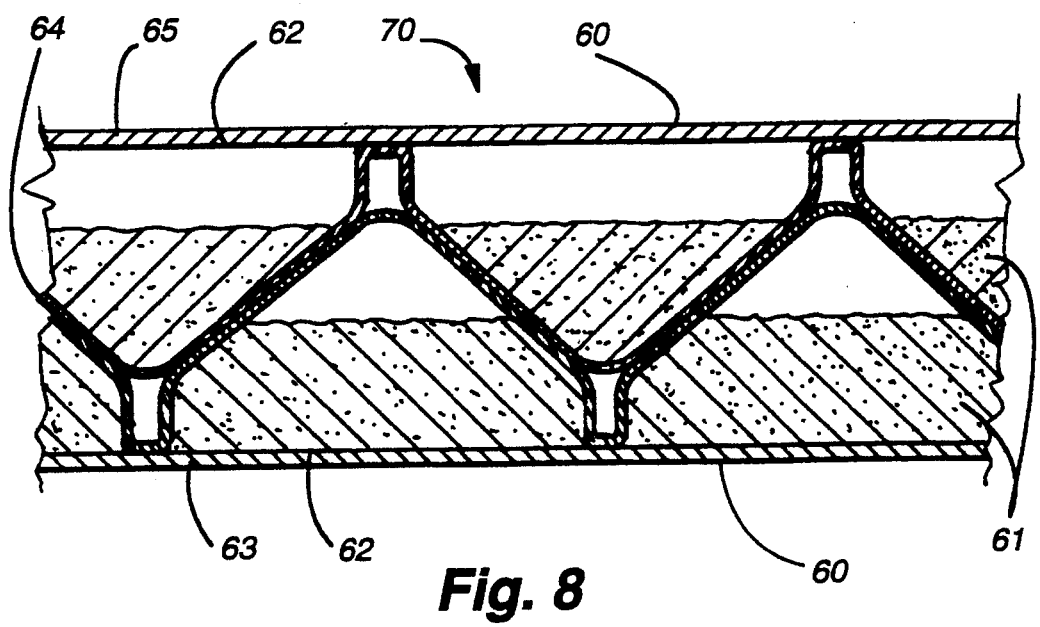
FIG. 8 is a sectional view of the thermal barrier of FIG. 8 taken along line 8—8.

Thermal barriers 60 having "bubble-wrap" construction are shown in FIGS. 7 and 8. The bubble-wrap construction confines temperature stabilizing material 61 to particular cells 62 and prevents leakage of the material 61. Each "bubble-wrap" thermal barrier 60 is comprised of a first sheet 63 into which closely adjacent, hollow depressions 64 are thermally formed. Temperature stabilizing material 61 is deposited in a substantially uniform manner in each of the depressions 64. The temperature stabilizing material 61 deposited in each depression 64 does not completely fill the depressions 64, to provide sufficient room for expansion of the temperature stabilizing material 61 during use. A second sheet 65 is overlaid on the first sheet 63 and adhesively attached thereto, thereby defining the cells 62 and encasing the temperature stabilizing material therein.

The bubble pack thermal barriers 60 shown in FIGS. 7 and 8 may be installed as an effective thermal barrier by attachment to walls of residential buildings. To construct a thermal barrier 60 suitable for such an application, sheets 63 and 65 of polyethylene are obtained. The first sheet 63 is approximately 3 mils thick and 8 feet wide and the second sheet 65 approximately 4 mils thick and 8 feet wide. To make the thermal barrier 60, the first sheet 63 is dispensed from a roll and fed into a heated enclosure to heat and soften the sheet 63. The sheet 63 exits the heated enclosure and is fed between two pressure forming rollers, one of which has a repeating and uniform pattern of convex, hemispherical injection protrusions extending therefrom. The protrusions are approximately ⅜" in diameter, with ⅛" margins between adjacent protrusions. The protrusions are adapted to fit into cooperating hollows formed in the second pressure forming roller. When the pre-warmed first sheet 63 passes between the two pressure forming rollers, an even pattern of ⅜" diameter depressions 64 are formed therein. Once the depressions 64 are formed, liquid n-octadecane is injected into the depressions 64 by the injector protrusions, filling each of the depressions approximately 80% full.

After injection of the n-octadecane, the first sheet 63 is fed between a pair of sealing rollers. One of the sealing rollers has a uniform pattern of concavities formed therein which are sized to receive the octadecane-filled portions of the first sheet 63. The second sheet 65 is also fed between the sealing rollers. Heat and pressure are then applied to the first and second sheets 63 and 65 with the sealing rollers, forming a pressure and heat seal at the points of contact between the second sheet 65 and the margins of the depressions 64 of the first sheet 63. Thereafter, the sealed thermal barrier 60 is cooled by forced air streams directed at the first and second sheets 63 and 65 as the thermal barrier 60 is taken up on a receiving roller.

In the embodiments shown in FIG. 7 and 8, pairs of thermal barriers 60 are layered in an offset relationship to form a thermal barrier 70 having a substantially "monolithic" mass of temperature stabilizing material. The thermal barrier 70 is assembled by overlaying a first thermal barrier 60 with a second thermal barrier 60, with the centers of the cells 62 of the first thermal barrier intermeshed in an offset position between adjacent cells 62 of the second thermal barrier. This arrangement results in a thermal barrier 70 in which the thickness of temperature stabilizing material 61 across the thermal barrier 70 is substantially uniform. Optionally, individual cells 62 of each of the thermal barriers 60 may contain different temperature stabilizing material 61 or a mixture of temperature stabilizing materials 61.

In another embodiment, a pair of thermal barriers 60 are layered "back-to-back" with the second sheet 65 of a first barrier 60 in contact with the second sheet 65 of a second barrier 60 (not shown). The centers of the cells 62 of the first thermal barrier 60 are positioned in an offset alignment relative to the centers of cells 62 of the second thermal barrier 60, so that the thickness of the temperature stabilizing material across the pair of thermal barriers 60 is substantially uniform.

In yet another embodiment, heat and pressure are applied to the cells 62 of a single thermal barrier 60, until adjacent cells 62 are substantially contiguous and the thickness of temperature stabilizing material across the thermal barrier is everywhere substantially uniform (not shown).

The thermal barriers 60 or 70 described above may be installed as insulation in the walls of a residential structure of frame construction. After studs of the frame are mounted to the floor, an eight-foot wide sheet of the thermal barrier 60 or 70 is unrolled and mounted the studs of the frame, facing the interior of the residential structure. Thereafter, sheet rock or other wall board is attached to the studs, sandwiching the thermal barrier 60 or 70 between the studs and the sheet rock. Optionally, traditional fiberglas™ insulation may be placed in the interstud spaces before mounting the thermal barrier 60 or 70 to the studs.

Thermal barriers of the present invention can also be attached to rigid backing material. For example, the thermal barriers of the present invention may be attached to fiberglas™ backing, wall boards, or foam building insulation prior to mounting such rigid backing or insulation material in a building or other structure. Moreover, in any of the above embodiments, one or more of the sheets may have a reflective material applied to one or both sides, or may be constructed of a reflective material to further reduce radiant heat loss or absorption.

The temperature stabilizing material 16, 31, 41, 51 and 61 may be microencapsulated. Such microcapsules, preferably range in size from 0.5 microns to 1000 microns, formed according to conventional microencapsulation methods well known to those skilled in the art. Microencapsulated temperature stabilizing material can be mixed with a suitable adhesive and applied directly to a substrate to achieve a desired layer thickness.

Figure 3:
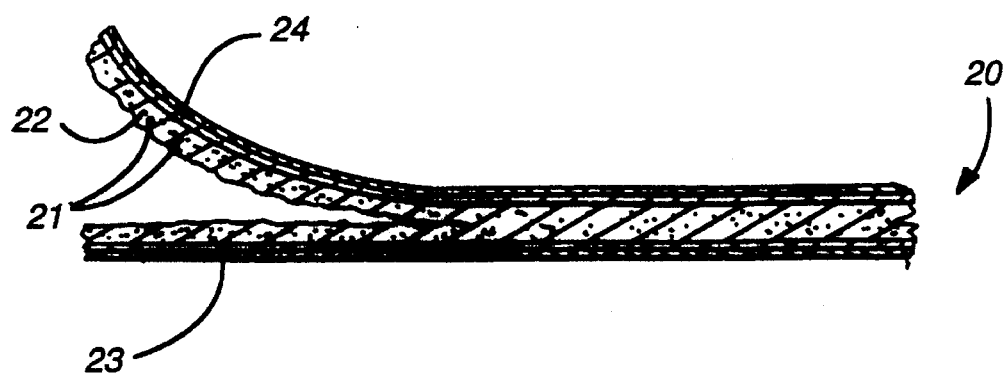
FIG. 3 is a sectional view of a thermal barrier showing two sheets partially assembled in which microencapsulated phase change material is present in an adhesive mixture placed between two sheets.

In the embodiment 20 shown in FIG. 3, a pair of opposing substrate sheets are overlaid and adhesive 22 retains microencapsulated materials 21 in a desired spatial relationship in a chamber created therebetween. Additionally, the adhesive 22 may bind together two opposing substrate sheets 23 and 24. However, sealing together of the sheets 23 and 24 may be unnecessary if the adhesive material is allowed to cure in a manner so that phase change material is held in the adhesive matrix. Adhesives should be selected that permit microencapsulated phase change materials to be appropriately suspended in the adhesive mixture and application of the microencapsulated/adhesive mixture should preferably be performed in such a manner that substantially even distribution over the surface area of the substrate is achieved. Suitable adhesives for use in the present invention include various types of foamed or flat latex or rubber compositions such as caulking and adhesive agents conventionally used in the construction, home furnishing and textile industries.

In still other embodiments, a thermal barrier of the present invention can be produced without being secured permanently to a substrate sheet. For example, microencapsulated phase change material can be mixed with a liquified material such as a plastic and allowed to cure, creating a barrier that contains phase change material dispersed throughout and suspended within the barrier. Microencapsulated temperature stabilizing material is preferably present in the barrier in an effective amount so that the amount of time it takes for heat to be conducted through the barrier is substantially greater (i.e., at least five seconds) than it would be for a barrier that did not contain such temperature stabilizing material.

To produce the thermal barrier 10 shown in FIGS. 1 and 2, adhesive is spread in a continuous strip on the sheet 14 directly adjacent to the peripheral edges of the sheet and is also applied in a continuous strip on the outwardly facing side of the sheet 12 directly adjacent to its peripheral edges. Application of adhesive can be accomplished with a brush, sprayer or other applicator to a desired thickness. The peripheral edges of the sheet 14 is then folded over the peripheral edges of the sheet 12, and a seal is thus created. Typically, the sealing operation takes place after the temperature stabilizing material 16 has been disposed between the sheets 12 and 14; however, sealing of various edges can be accomplished prior to that time and temperature stabilizing material can be placed between substrate sheets after sealing by injection of such material.

Plastic foam having microencapsulated temperature stabilizing material therein or coated thereon may also be applied to or poured into the chambers of a thermal barrier to create a plurality of tiny air spaces and a plurality of heat absorbing microcapsules (not shown).

When using microencapsulated temperature stabilizing material it is preferred that the outer shell of the microencapsulated temperature stabilizing material be leak resistant. Microcapsules should be able to withstand repeated mechanical stresses with minimal risk of rupturing, thereby assuring that the thermal characteristics of the thermal barrier into which the microcapsules are installed are maintained. Use of microcapsules, either in a sealed compartmentalized barrier or in an admixture of adhesive or foam, facilitates a relatively even distribution of phase change material over the surface area of the barrier.

Thermal barriers of the present invention are preferably flexible so that they can be shaped to conform to any predetermined configuration. This allows installation of the thermal barriers in spaces having planar, curved or irregular shapes.

Barriers of the present invention can be constructed of a thickness suited to expected temperature conditions. Preferred barriers are constructed so that they have a thickness of between about 1/16" to about 1" more preferably less than about ½", and most preferably below about ¼". By maintaining thermal barriers as relatively thin sheets, desired flexibility of the barriers is maintained. Several barrier layers can be used in situations where additional thickness is required, such as where different layers of distinct phase change materials are required to address temperature fluctuation.

Thermal barriers can be constructed and used for various applications in which hot and cold temperature environments are encountered. For example, thermal barriers of the present invention find application in textiles used in the manufacture of clothing for firemen, scuba divers, astronauts and mountaineers (e.g., shoes, gloves, underwear, jacket linings and socks). Such barriers can also be used in other textile applications such as in blankets, wallpaper, circuit board laminates, curtain linings, sleeping bags, bedding, automotive lining material, carpets, pipe wrap, tiles, concrete, etc. The thin and flexible nature of the thermal barriers of the present invention allow conventional bulky thermal material to be replaced in these as well as other applications that will be apparent to those of ordinary skill in the art.

Presently preferred embodiments of the present invention and many improvements have been described with a degree of particularity. It should be understood that the present invention is defined by the spirit and scope of the following claims.

What is claimed:

1. A flexible thermal barrier comprising:

two spaced apart opposing sheets defining a chamber therebetween;

a flexible, cell-defining structure positioned between and attached to said opposing sheets and defining a plurality of discrete cells of said chamber; and a temperature stabilizing material containing a heat storage material selected from the group consisting of phase change materials and plastic crystals, said heat storage material having a predetermined temperature at which heat is controllably absorbed or released therefrom, said temperature stabilizing material substantially filling each said cell such that a substantially uniform distribution of said temperature stabilizing material is maintained across said flexible thermal barrier by said flexible cell-defining structure.

2. The flexible thermal barrier of claim 1 wherein said flexible thermal barrier is from approximately 1/16" to approximately 1" thick.

3. The flexible thermal barrier of claim 1 wherein said heat storage material comprises a phase change material selected from the group consisting of paraffinic hydrocarbons, salt hydrates and glycols.

4. The flexible thermal barrier of claim 1 wherein at least two different heat storage materials are disposed in said cells.

5. The flexible thermal barrier of claim 3 wherein said flexible, cell-defining structure is a corrugation sheet.

6. The flexible thermal barrier of claim 3 wherein said flexible, cell-defining structure is a honeycomb structure.

7. The flexible thermal barrier of claim 3 wherein said phase change material is encased in microcapsules ranging in diameter from about 0.5 to 1,000 microns.

8. A flexible thermal barrier comprising:

a first sheet having a plurality of closely adjacent depressions formed therein;

a temperature stabilizing material containing a heat storage material selected from the group consisting of phase change materials and plastic crystals, said heat storage material having a predetermined temperature at which heat is controllably absorbed or released therefrom, said temperature stabilizing material disposed in said depressions; and a second sheet overlying and attached to said first sheet and defining therewith a plurality of closely contiguous and discrete cells having no gaps between cells such that a substantially uniform distribution of said temperature stabilizing material is maintained across said flexible thermal barrier.

9. The flexible thermal barrier of claim 1 wherein said heat storage material comprises a paraffinic hydrocarbon.

10. A flexible thermal barrier comprising:

at least two adjoining and overlying layers, each said layer comprising:

a first sheet having a plurality of closely adjacent depressions formed therein;

a temperature stabilizing material containing a heat storage material selected from the group consisting of phase change materials and plastic crystals, said heat storage material having a predetermined temperature at which heat is controllably absorbed or released therefrom, said temperature stabilizing material disposed in said depressions; and a second sheet attached to said first sheet, overlying said depressions and said temperature stabilizing material and defining therewith a plurality of noncommunicating, discrete cells; said cells of adjoining layers being offset, such that a substantially uniform distribution of said temperature stabilizing material is maintained across said flexible thermal barrier.

11. The flexible thermal barrier of claim 10 wherein said said heat storage material comprises a phase change material selected from the group consisting of paraffinic hydrocarbons, salt hydrates and glycols.

12. The flexible thermal barrier of claim 11 wherein said phase change material is a paraffinic hydrocarbon.

13. The flexible thermal barrier of claim 12 wherein said paraffinic hydrocarbon is enclosed in microcapsules ranging in diameter from about 0.5 to 1,000 microns.

14. A method of manufacturing a flexible thermal barrier comprising the steps of:

depositing a temperature stabilizing material containing a heat storage material selected from the group consisting of phase change materials and plastic crystals, said heat storage material having a predetermined temperature at which heat is controllably absorbed or released therefrom, said temperature stabilizing material on a first sheet;

covering said temperature stabilizing material with a second sheet;

connecting said first sheet to said second sheet with a flexible, cell-defining structure at multiple intermediate locations on each of said first and second sheets to confine said temperature stabilizing material between said first and second sheets; and maintaining a substantially uniform thickness of said temperature stabilizing material between said first and second sheets.

15. The method as set forth in claim 14 wherein said heat storage material comprises a phase change material selected from the group consisting of hydrated salts, paraffinic hydrocarbons, and glycols.

16. The method as set forth in claim 15 wherein said heat storage material comprises at least two different phase change materials.

17. A method of manufacturing a thermal barrier comprising the steps of:

positioning a first sheet overlying and spaced apart from a second sheet;

positioning a flexible, cell-defining structure between said first and second sheets to define a plurality of discrete cells therebetween;

depositing a temperature stabilizing material containing a heat storage material selected from the group consisting of phase change materials and plastic crystals, said heat storage material having a predetermined temperature at which heat is controllably absorbed or released therefrom, said temperature stabilizing material in said cells; and maintaining a substantially uniform thickness of said temperature stabilizing material between said first and second sheets.

18. The method as set forth in claim 17 wherein said heat storage material comprises a phase change material selected from the group consisting of hydrated salts, paraffinic hydrocarbons, and glycols.

19. The method as set forth in claim 17 wherein said heat storage material comprises at least two different phase change materials.

20. The method as set forth in claim 17 wherein at least a portion of said heat storage material is microencapsulated.

21. The method as set forth in claim 17 wherein the flexible, cell-defining structure is a corrugation sheet.

22. The method as set forth in claim 17 wherein the flexible, cell-defining structure is a honeycomb structure.

23. A method of manufacturing a flexible thermal barrier comprising the steps of:

forming depressions in a first sheet;

depositing a temperature stabilizing material containing a heat storage material selected from the group consisting of phase change materials and plastic crystals in said depressions, said heat storage material having a predetermined temperature at which heat is controllably absorbed or released therefrom;

attaching a second sheet to said first sheet, encasing said temperature stabilizing material in cells formed therebetween; and maintaining a substantially uniform thickness of said temperature stabilizing material across said flexible thermal barrier.

24. The method as set forth in claim 23 wherein said heat storage material comprises a paraffinic hydrocarbon.

25. The flexible thermal barrier of claim 1 wherein said temperature stabilizing material substantially fills each said discrete cell leaving an expansion volume in said discrete cells.

26. The flexible thermal barrier of claim 25 wherein said heat storage material comprises a phase change material encased in microcapsules ranging in diameter from about 0.5 to 1,000 microns.

27. The flexible thermal barrier of claim 25 wherein said heat storage material is a phase change material selected from the group consisting of paraffinic hydrocarbons, salt hydrates and glycols.

28. The flexible thermal barrier of claim 25 wherein said flexible, cell-defining structure is a corrugation sheet.

29. The flexible thermal barrier of claim 25 wherein said flexible, cell-defining structure is a honeycomb structure.

* * * * *

UNITED STATES PATENT AND TRADEMARK OFFICE
CERTIFICATE OF CORRECTION

PATENT NO. : 5,532,039
DATED : July 2, 1996
INVENTOR(S) : Ed Payne, Bernard T. Perry, Terry D. Walker It is certified that error appears in the above-indentified patent and that said Letters Patent is hereby corrected as shown below:

Claim 9 at col. 10, line 7, delete "1" and substitute therefor --8--.

Signed and Sealed this

Fourteenth Day of January, 1997

*Attest:*

BRUCE LEHMAN

*Attesting Officer*      *Commissioner of Patents and Trademarks*